(12) United States Patent
Gisslegård et al.

(10) Patent No.: US 8,028,656 B2
(45) Date of Patent: Oct. 4, 2011

(54) MILKING DEVICES

(75) Inventors: Mikael Gisslegård, Kassmyravägen (SE); Torbjörn Pettersson, Rosenhed (SE); Johan Odeberg, Frejgtan (SE); Nils Älveby, Anders Reimers väg (SE); Martin Bellander, Tvärvägen (SE)

(73) Assignee: DeLaval Holding AB, Tumba (SE)

( * ) Notice: Subject to any disclaimer, the term of this patent is extended or adjusted under 35 U.S.C. 154(b) by 1280 days.

(21) Appl. No.: 10/539,019

(22) PCT Filed: Dec. 19, 2003

(86) PCT No.: PCT/SE03/02024
§ 371 (c)(1), (2), (4) Date: Jun. 16, 2006

(87) PCT Pub. No.: WO2004/056174
PCT Pub. Date: Jul. 8, 2004

(65) Prior Publication Data
US 2007/0012252 A1     Jan. 18, 2007

(30) Foreign Application Priority Data
Dec. 20, 2002   (SE) ..................................... 0203871

(51) Int. Cl.
*A01J 5/00* (2006.01)
(52) U.S. Cl. ................................................... 119/14.49
(58) Field of Classification Search .............. 119/14.47, 119/14.48, 14.49, 14.5, 14.51, 14.52, 14.53
See application file for complete search history.

(56) References Cited

U.S. PATENT DOCUMENTS

| | | | |
|---|---|---|---|
| 3,474,760 A | 10/1969 | Siddall et al. | |
| 3,941,859 A | 3/1976 | Batiuk et al. | |
| 4,059,070 A | 11/1977 | Siddall et al. | |
| 4,324,201 A | 4/1982 | Larson | |
| 4,459,938 A * | 7/1984 | Noorlander | 119/14.49 |
| 4,459,939 A * | 7/1984 | Noorlander | 119/14.49 |
| 4,572,106 A * | 2/1986 | Mills | 119/14.47 |
| 5,007,378 A * | 4/1991 | Larson | 119/14.47 |
| 5,317,988 A * | 6/1994 | Hoefelmayr et al. | 119/14.47 |
| 6,039,001 A | 3/2000 | Sanford | |
| 6,176,200 B1 | 1/2001 | Petterson | |
| 6,408,892 B1 | 6/2002 | Kondo et al. | |
| 2005/0058796 A1* | 3/2005 | Thomson et al. | 428/36.91 |

FOREIGN PATENT DOCUMENTS

EP    0 477 950 A1    4/1992
(Continued)

OTHER PUBLICATIONS

English translation of Japanese Office Action dated May 26, 2009.
(Continued)

*Primary Examiner* — T. Nguyen
(74) *Attorney, Agent, or Firm* — Young & Thompson (57) ABSTRACT

The present invention relates to devices and components for milking apparatus, in particular to milk extracting devices. Especially it relates to components of such devices such as liners (20). The novel devices include a material, selected from the group consisting of thermo-plastic elastomers, as defined in ISO 18064, plasticized PVC, Vinyl TPE, the material exhibiting the following properties: a hardness between 25 shore A and 50 shore D; a Young's modulus between 0.1 MPa and 50 MPa; a tensile strength above 0.5 MPa; and a minimum elongation of 50% without breakage.

22 Claims, 3 Drawing Sheets

FOREIGN PATENT DOCUMENTS

| | | |
|---|---|---|
| EP | 0 976 783 A1 | 2/2000 |
| EP | 1088855 | 4/2001 |
| GB | 411860 | 6/1934 |
| GB | 883448 | 11/1961 |
| GB | 996887 | 6/1965 |
| GB | 1400014 | 7/1975 |
| GB | 2343896 | 5/2000 |
| JP | 60-001266 U | 1/1985 |
| JP | 2001-504691 A | 4/2001 |
| JP | 2002-500023 A | 1/2002 |
| WO | WO 98/54260 A1 | 12/1998 |
| WO | WO 00/64985 A1 | 11/2000 |
| WO | WO 00/76298 * | 12/2000 |
| WO | WO 00/76298 A1 | 12/2000 |
| WO | WO 01/45498 | 6/2001 |
| WO | WO 02053359 | 7/2002 |

OTHER PUBLICATIONS

Denis N. Akam et al., Contributors, Machine Milking and Lactation, 1992, pp. 213-233, Insight Books.

Robert S. Brookman, "Flexible PVC: an industry mainstay pushes the performance envelope. (flexible polyvinyl chloride)(Statistical Data Included)", Plastics Engineering, Jun. 1, 2002, pp. 1-6.

S. Kovac et al., "Research of Some Properties the Teat Rubbers", Pakistan Journal of Biological Sciences, 2000, pp. 57-60, vol. 3, No. 1, Capricorn Publications.

G.A. Mein et al., "A comparison of the milking characteristics of transparent and conventional teatcup liners", J. Dairy Res., 1970, pp. 535-548, vol. 37.

Benjamin M. Walker et al., Editors, Handbook of Thermoplastic Elastomers, Second Edition, Van Nostrand Reinhold Company.

Gerald M. Ward et al., "Milking Efficiency and Durability of Milking Machine Inflations of Various Compoundings", Journal of Dairy Science, pp. 947-949.

GLS-Thermoplastic Elastomer FAQs, Jun. 25, 2008, pp. 1-7, http://www.glscorporation.com/resources_faqs.php.

Internet Archive Wayback Machine, Jun. 25, 2008, p. 1, http://web.archive.org/web//http://www.inflations.net/polymeres.htm.

"Polymer", Jun. 25, 2008, pp. 1-2, http://web.archive.org/web/20000903140214/http://www.inflations.net/polymeres. htm.

Thermoplastic Elastomers, Oct. 2007, pp. 1-28.

"Thermoplastic elastomer", May 20, 2008, pp. 1-4, Wikipedia, http://en.wikipedia.org/wiki/Thermoplastic_elastomer.

TPV: Thermoplastic Vulcanizates, May 29, 2008, pp. 1-2, http://www.hitechpolymers.com/Products/tpv.asp.

"Young's modulus", Jun. 18, 2008, pp. 1-5, Wikipedia, http://en.wikipedia.org/Young's_modulus.

* cited by examiner

MILKING DEVICES

The present invention relates to generally devices and components for milking apparatus, in particular to components of such devices such as milk extracting devices, and liners. In particular aspects it relates to a liner comprising an improved teat receiving flexible sleeve, and optionally a short milk tubing, preferably but not necessarily integrated with the liner, and made from Thermo Plastic Elastomers, optionally in combination with other materials.

BACKGROUND OF THE INVENTION

Machine milking has been available for about a century. The basic construction of a milking device, which is still in use today is based on an invention patented by Gillies in 1902, and comprises a double chambered teat cup designed to operate with a pulsating vacuum. The teat cup comprises a flexible sleeve made of rubber, forming one flexible wall of a chamber, where the teat cup shell forms the other wall. In the space between the two walls a pulsating vacuum is applied whereby the sleeve will expand and contract, thereby causing a massaging action on a teat on which the teat cup has been applied.

The flexible sleeve is provided as a part of a so called teat cup liner (or inflation in U.S. English; in the present specification and claims the term "liner" will be used throughout).

A milking apparatus as a whole comprises a number of different components, many of which currently are made of different kinds of rubber, e.g. tubing, nozzles, liners etc.

As an example, a modern teat cup system is disclosed in U.S. Pat. No. 6,176,200 (Petterson). It comprises a tubular head portion capable of receiving a teat, and a shaft portion forming an inner wall of the pulsating vacuum chamber. The shaft portion is flexible and normally made of a rubber compound.

In order to be accepted by the market, devices forming the components of milking apparatus, such as teat cups and liners, must exhibit a number of properties. Examples that can be mentioned are the following:
Good milking performances, e.g., milk speed, milk yield, slip, strip yield
Good teat treatment
Long lifetime of the device and capability of functioning at the same high level of performance over the entire lifetime.
Uniform quality of the devices.
Chemical and physical endurance
Devices should be easy to clean
Devices should be easy to replace
Devices should be environmentally friendly, e.g., recycling of the material should be possible
The product must comply with regulations relating to material and to articles and products that are intended to come into contact with foodstuff.

Currently available components of milking apparatus, such as liners and tubing, are most often made of rubber materials, which do not meet the above requirements to a totally satisfactorily degree.

SUMMARY OF THE INVENTION

The present invention therefore seeks to provide improved devices and components usable in milking apparatus and that meet all the requirements listed above. This is achieved in accordance with the invention by a teat cup liner for a milking apparatus that comprises a material, selected from the group consisting of i) thermoplastic elastomers (TPE), as defined in ISO 18064, ii) plasticized PVC, iii) Vinyl TPE, and exhibiting a number of selected properties.

This novel teat cup liner is defined in claim 1.

Preferably, an improved teat cup liner comprises at least a teat receiving flexible sleeve, adapted to be positioned on/over a teat, suitably in a close fit.

The devices according to the invention provides the following advantages:

No compounding or blending of the material is required for the manufacturing process. TPE:s are like thermoplastics ready for use as delivered. TPE:s are not sensitive to storage compared to vulcanized rubber. Simpler processing with fewer steps is needed. TPE:s has the processing simplicity of a thermoplastic giving more efficient processing and thereby significantly lower processing costs. Shorter fabrication cycles leading to lower energy consumption and manpower cost. Recycling of scrap material possible. Scrap resulting from thermoset production is normally discarded. As with thermoplastics regrind from TPE processing can be recycled to give same properties as virgin material. Better quality control and closer tolerances on fabricated parts. In most cases a lower density will result. No low temperature hardening (crystallisation) occurs as with some thermoset rubbers. Since TPE:s are recyclable, it facilitates environmentally friendly handling of products made of these materials as far as recycling is concerned. It is simpler to combine different materials in one and the same unitary structure, such that different parts are made of different materials. For example, a first portion can be made of a TPE of one type, and further portions can be made of TPE's of other types, exhibiting different properties, such as making layered structures of different materials.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description and the accompanying drawings which are given by way of illustration only, and thus not limitative of the present invention, and wherein.

DETAILED DESCRIPTION OF PREFERRED EMBODIMENTS

For the purpose of this application, the expression "liner" or "teat cup liner" is taken to encompass a device usable together with a milking apparatus or system, that is to be used in the dairy business e.g. in contact with the milk, and therefore must comply with regulations relating to materials and articles intended to come into contact with foodstuffs. A liner comprises at least a teat receiving flexible sleeve, adapted to be positioned on/over a teat, suitably in a close fit. At the end proximal of the teat receiving end, there can be provided a short milk tube, to be attached to the teat cup central. It can also comprise a supply tubing for pulsating medium, referred to as a "pulsation tubing". It is to be noted that the liner according to the invention may be used for various different animals, e.g. cows, buffalos, sheep and goats and other ruminant animals.

"A teat cup" is taken to be a device comprising a housing, "teat cup shell" in which a liner, as defined above is mounted. In accordance with the invention, by the surprising flexibility in the employment of the class of materials discussed herein, broadly defined by the specified material properties, and exemplified by thermoplastic elastomers, thermoplastic vulcanisates and plasticized PVC, it will in particular become possible to manufacture devices exhibiting different mechanical and physico-chemical properties in different parts or regions of the device, thereby enabling a tailoring of properties for specific uses.

Figure 1:
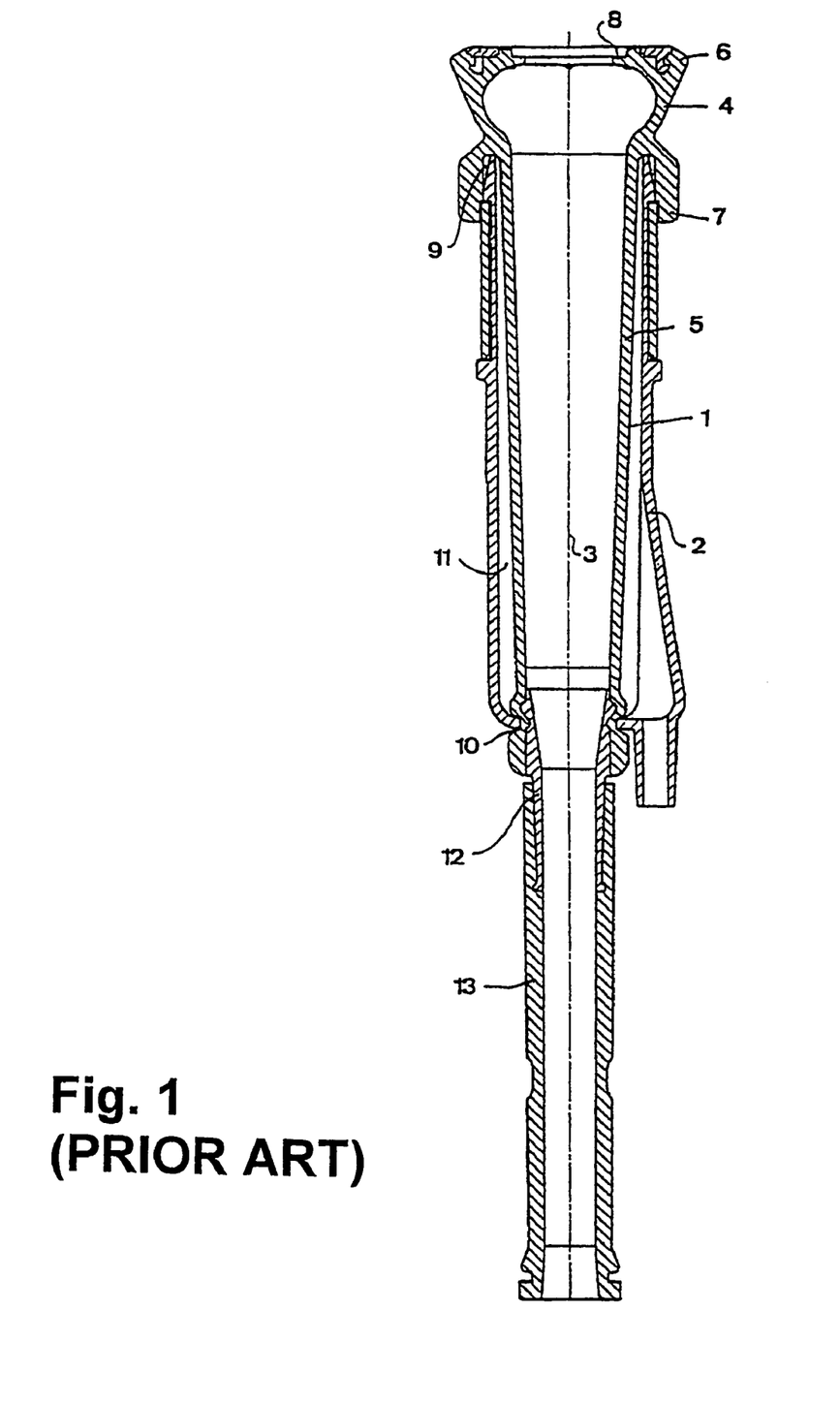
FIG. 1 shows an example of a prior art device for a milking apparatus, namely a teat cup and a liner.

In FIG. 1, an exemplary prior art teatcup is disclosed. It is provided with a teatcup liner 1 which is mounted in a teat cup shell 2. The teatcup liner 1 is essentially rotationally symmetrical with respect to a longitudinal axis 3 and comprises an upper tubular head portion 4 and a tubular, flexible teat receiving sleeve portion 5 extending downwardly from the head portion 4. The head portion 4 comprises a first upper end 6 and a second lower end 7. At the upper end 6, the tubular head portion 4 comprises a lip 8 extending radially inwardly and defining an essentially circular central opening. The tubular head portion 4 forms a passage through the head to the inner space of the teatcup liner for receiving a teat in the sleeve 5. The lower end 7 comprises an annular recess 9 which is engaged by the upper end portion of the teatcup shell 2. The lower part of the sleeve 5 comprises a peripheral surrounding recess 10 which is engaged by the lower end portion of the teatcup shell 2. The recesses 9 and 10 are shaped in such a manner that a closed space 11 is formed between the teatcup liner and the teatcup shell 2, which space 11 forms a pulsating chamber of the teatcup. In its lower part, the teatcup liner 1 connects to prolongation pieces 12 and 13, which form a milk conduit which may be connected to a claw (not disclosed). The teatcup liner 1 is manufactured in an elastic material, for instance natural or synthetic rubber.

The invention is based on the finding that thermoplastic elastomers (TPE) can be made to meet the material requirements for providing devices and components for milking apparatus and systems. Therefore, a brief introduction to the TPE technology will be given.

Thermoplastic Elastomers (TPE)
Introduction

Before the development of TPE:s there were generally speaking only rigid or semi-rigid articles products that could be manufactured and processed with the new technology for thermoplastics. The production of thermoplastics are faster, less energy consuming, cleaner and it is easier to re-use scrap.

For elastomeric materials there were lack of alternatives for thermoset rubbers. For applications not exposed to extreme temperatures there is no fundamental need for temperature resistant crosslinking-sites. The use of thermoset rubbers will have the accompanying disadvantages of the crosslinking.

The incentives for developing thermoplastic materials exhibiting elastic properties without any permanent crosslinking sites have therefore been strong.

Thermoplastic elastomers (TPE) are materials that combine the processing properties of a thermoplastic material with the elastomeric properties of a rubber material.

Thermoplastic elastomers are two-phase systems. One of the phases is a hard polymer that gives the mechanical strength at service temperatures but becomes fluid when heated above the melting- or glass transition temperature ($T_g$). The other phase is a soft rubbery polymer.

There are principally two ways to achieve the properties; namely by providing the material in the form of block copolymers or polymer blends.

Block copolymers meeting the definition of thermoplastic elastomers consist of two phases, one hard and one soft, formed from segments in the same chain of a molecule. The harder segment could be crystalline with a high melting temperature or an amorphous material with a high glass transition temperature. The soft segment is always amorphous with a very low glass transition temperature.

Examples: TPS (amorphous hard phase), TPU, TEEE, TPA (semi-crystalline hard phase). Abbreviations see below.

TPE made from polymer blends, are blends of a hard material, almost exclusively semi-crystalline with a high melting temperature in a continuous phase blended with a softer at least mainly amorphous material with a very low glass-transition temperature.

Examples: TPO, TPV
Nomenclature

According to ISO 18064 the classes and abbreviations for TPE:s are (within bracket other common abbreviations):
TPE: Thermoplastic elastomers in general.
TPS: (SBC) Polystyrene/elastomer block copolymers.
TPO: Polypropylene/EP copolymers blends.
TPV: Thermoplastic vulcanisates.
TPU: Polyurethane block copolymers.
TEEE (COPE) Polyester block copolymers.
TPA: (COPA) Polyamide block copolymers.
General Properties of TPE-Materials

TABLE 1

Comparison of General Properties for TPE Materials

|  | TPS | TPO | TPV | TPU | TEEE | TPA |
| --- | --- | --- | --- | --- | --- | --- |
| Density (kg/dm3) | 0.9-1.1 | 0.89-1.0 | 0.9-1.0 | 1.1-1.3 | 1.1-1.3 | 1.0-1.2 |
| Shore Hardness | 3A-60D | 60A-75D | 35A-50D | 60A-85D | 90A-72D | 60A-75D |
| Low temperature limit °C. | −70 | −60 | −60 | −70 | −65 | −40 |
| High temperature limit (continuous)° C. | 120 | 120 | 135 | 120 | 125 | 170 |
| Compression set resistance at 100° C. | F | P | G | F/G | F | F/G |
| Resistance to hydrocarbon fluids | F/G | P | G/E | F/E | G/E | G/E |
| Resistance to aqueous fluids | G/E | G/E | G/E | F/G | P/G | F/G |
| Price ratios | 1-3.6 | 1.5-2.5 | 2.5-3.0 | 2.0-4.0 | 4.0-6.0 | 4.0-9.0 |

TABLE 1-continued

Comparison of General Properties for TPE Materials

| | TPS | TPO | TPV | TPU | TEEE | TPA |
|---|---|---|---|---|---|---|

P = Poor
F = Fair
G = Good
E = Excellent

Styrenic Block Copolymers (TPS or SBC)

TPS materials include three distinctly different main types:

Styrene-butadiene-styrene block copolymers (SBS)

Styrene-isoprene-styrene block copolymers (SIS)

styrene-ethylene-butylene-styrene block copolymers (SEBS)

SBS and SIS Polymers

Figure 3:
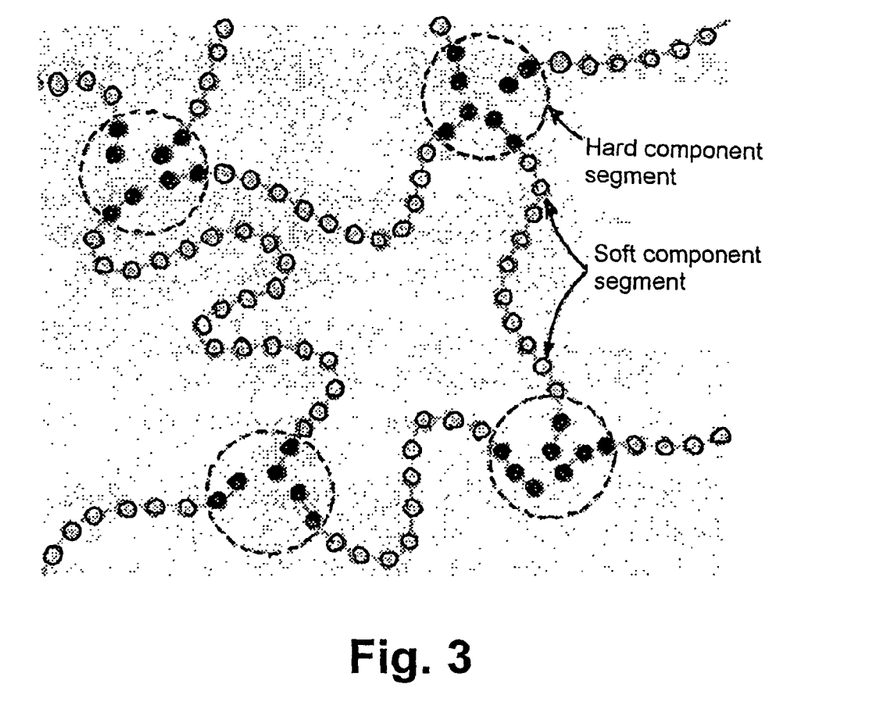
FIG. 3 illustrates styrene polymers suitable for use in the invention.
Figure 4:
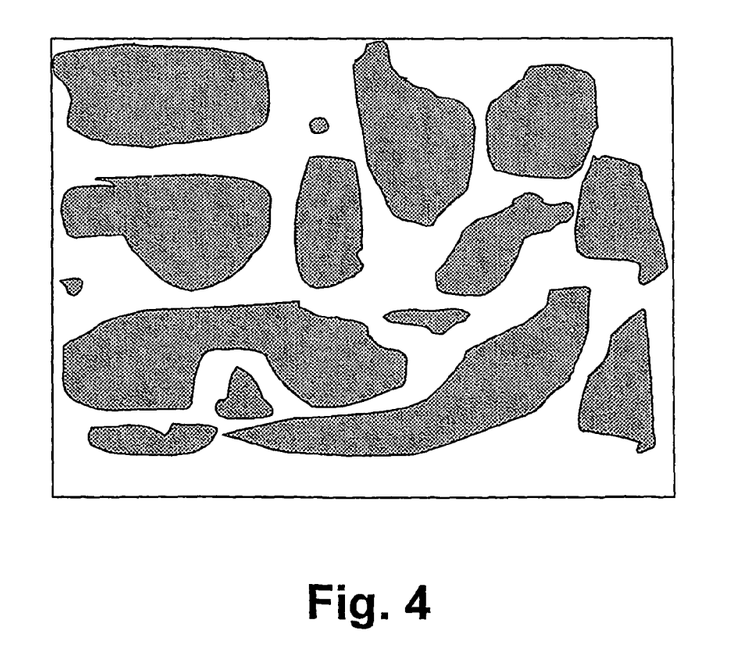
FIG. 4 illustrates the two-phase structure of Thermoplastic vulcanisates (TPV).

Styrene and butadiene (or isoprene) are incompatible and form a two-phase system with two distinct Tg:s. The stiffer styrene-phase acts as physical crosslinking points between the more flexible butadiene (or isoprene) phase, see FIG. 3.

Thermoplastic Olefins TPO:s

Thermoplastic olefins are blends of polypropylene (PP) and ethylene-propylene copolymer (EPM) or ethylene-propylene-diene polymer (EPDM). The term EP(D)M covers both EPDM and EPM.

PP-EP(D)M blends are produced by intensive mixing of PP and EPDM and/or EPM.

The polypropylene is normally an isotactic homopolymer or an isotactic PP with minor content of ethylene. The melting point of these semi-crystalline polymers are in the range 145-165° C.

A TPO can therefore retain many of it's mechanical properties at high temperatures. An EP(D)M with 50:50 ratio ethylene and propylene are almost completely amorphous although both polyethylene and polypropylene are semi-crystalline polymer. Changing i.e. the ethylene content to a higher ratio gives some crystallinity. The net effect of a small amount of ethylene crystallinity greatly influences the strength of the rubber.

Properties:

Since PP and EP(D)M can be blended in any ratio, there is theoretically a continuous spectrum from lightly modified thermoplastic PP to EP(D)M reinforced with thermoplastic.

TABLE 3

Comparison TPO-grades

| Property/TPO | EP(D)M/PP 80/20 | EP(D)M/PP 67/33 | EP(D)M/PP 50/50 |
|---|---|---|---|
| Tensile strength (Mpa) | 6 | 9.5 | 12 |
| Shore A Hardness | 77 | 87 | 95 |
| Brittle point | <-60° C. | <-60° C. | <-60° C. |
| TPO Strong points | Service temperature range -60-125° C., low brittle point, high impact strength, High E-modulus. Good resistance to polar organic fluids. | | |
| TPO weak points | Low elasticity, low elongation at break, high compression set. Poor resistance to hydrocarbons and halocarbons. Drying needed before processing. | | |

Polymers Based on Metallocene Technology

During the 90's new polyolefinic resin based on metallocene catalyst technology were introduced. These are copolymers, consisting of ethylene and higher olefins such as 1-octene. The metallocene technology makes it possible to design very precisely the distribution of e.g. 1-octene and ethylene in the polymer chain. When the 1-octene content is around 30% or more there is no crystallinity in the polymer. If some crystallinity is desired a polymer with lower amount of 1-octene can be produced.

Thermoplastic Vulcanisates (TPV)

Thermoplastic vulcanisates (TPV) are two-phase systems consisting of a thermoplastic continuous phase and a crosslinked rubber as the discontinuous phase. The dominating system is PP/EPDM but there are also PP/NBR systems.

The rubber phase is more vulcanised than TPO:s where the rubbery phase is just partly or not vulcanised. The vulcanisation of the rubber phase results in numerous property improvements.

Thermoplastic Polyurethane Elastomers (TPU)

TPUs are block copolymers with urethane backbone linkages. They are synthesised by condensation of diisocyanates with short chain diols and polyester and/or polyether diols.

The short-chain diols along with diisocyanates form the crystalline hard phase in the TPU. The crystallites acts as physical crosslinking points and heat resistance of TPUs are closely related to the melting point of these crystallites. Short chain diols like 1.4-butanediol and 1.6-hexanediol are commonly used.

The soft segment is formed from hydroxylterminated polyesters or hydroxyl-terminated polyethers.

The soft segment of TPU will determine the elastic and low-temperature properties. The hardness and modulus will be determined by ratio of hard and soft segments.

Thermoplastic Copolyesters (TEEE), (COPE)

Thermoplastic Copolyester materials consist of block copolymers of alternating hard and soft segments connected by ester and ether linkages, the soft segments can be polyethers, polyesters or copolyesters. The principal differences between the soft segments are the same as for TPU:s. The hard segment is almost exclusively polybutylenterephtalate (PBT)

Polyamide Block Copolymers (TPA, COPA)

Block copolymers of hard and soft segments. The hard segments are polyamides and soft segments are polyolblocks with a polyether chain or a polyester chain.

The polyamide block can be any PA 6, PA6/6, PA 11. PA12, PA 6/11 or PA 6/12. This will determine the melting point and influence the density and the chemical resistance.

The type of soft segment will influence properties like resilience, tear strength, hydrolytic stability, abrasion resistance, low temperature flexibility, toughness and microbial resistance non-polar solvents like.

Polyether chain are most common and are preferred for their low temperature resistance and hydrolytic stability. Polyester chains are preferred when good solvent resistance and high temperature stability is preferred.

Other Materials with TPE-Properties

Plasticised PVC

There is actually one material that is classified as a thermoplastic but actually has properties similar to TPE. Plasticized polyvinyl chloride (PVC) commonly regarded as an amorphous thermoplastic material can be used more than 100° C. above it's glass-transition temperature, still maintaining acceptable mechanical properties.

Although not in nomenclature regarded as a TPE, plasticized PVC (=flexible PVC or pPVC) was in fact the first material to combine elastomeric properties with thermoplastic processing. Nowadays it is known that this is due to that the polyvinyl chloride chain partly gives regular crystal-like structures involving two or more chains giving meltable crosslinking points. These structures have a very wide range of melting temperatures, from below 0° C. up to almost 200° C. The upper temperature limit for PVC with standard plasticizer is around 60° C., and with speciality plasticizer 105-120° C.

Vinyl TPE:s

Conventional plasticized PVC is based on plasticizers which have a very good miscibility with the PVC. When mixing with elastomers like NBR or acrylate elastomers a two-phase system more like i.e. the TPO and TPV:s can be achieved. Such materials can especially give better compression set and better chemical resistance than conventional plasticized PVC.

The suppliers of these materials sometimes call them Vinyl TPE:s, although it seems to be doubtful that these materials are generally accepted as a member of the TPE family. As described above normal plasticized PVC could also be described as a TPE. Thus, in accordance with the invention, a teat cup liner, as defined previously, is made of a material including one or more materials in combination selected from a group of materials including the above discussed.

A teat cup is a milk extracting device, i.e. a device constituting a part or component of a milking apparatus that acts on the teat of an animal, or cooperates with other parts of the milking apparatus, such that the udder will release milk in a controlled manner. A teat comprises a liner, which in its turn comprises at least a flexible teat receiving sleeve, adapted to be positioned on/over a teat in a close fit.

Figure 2:
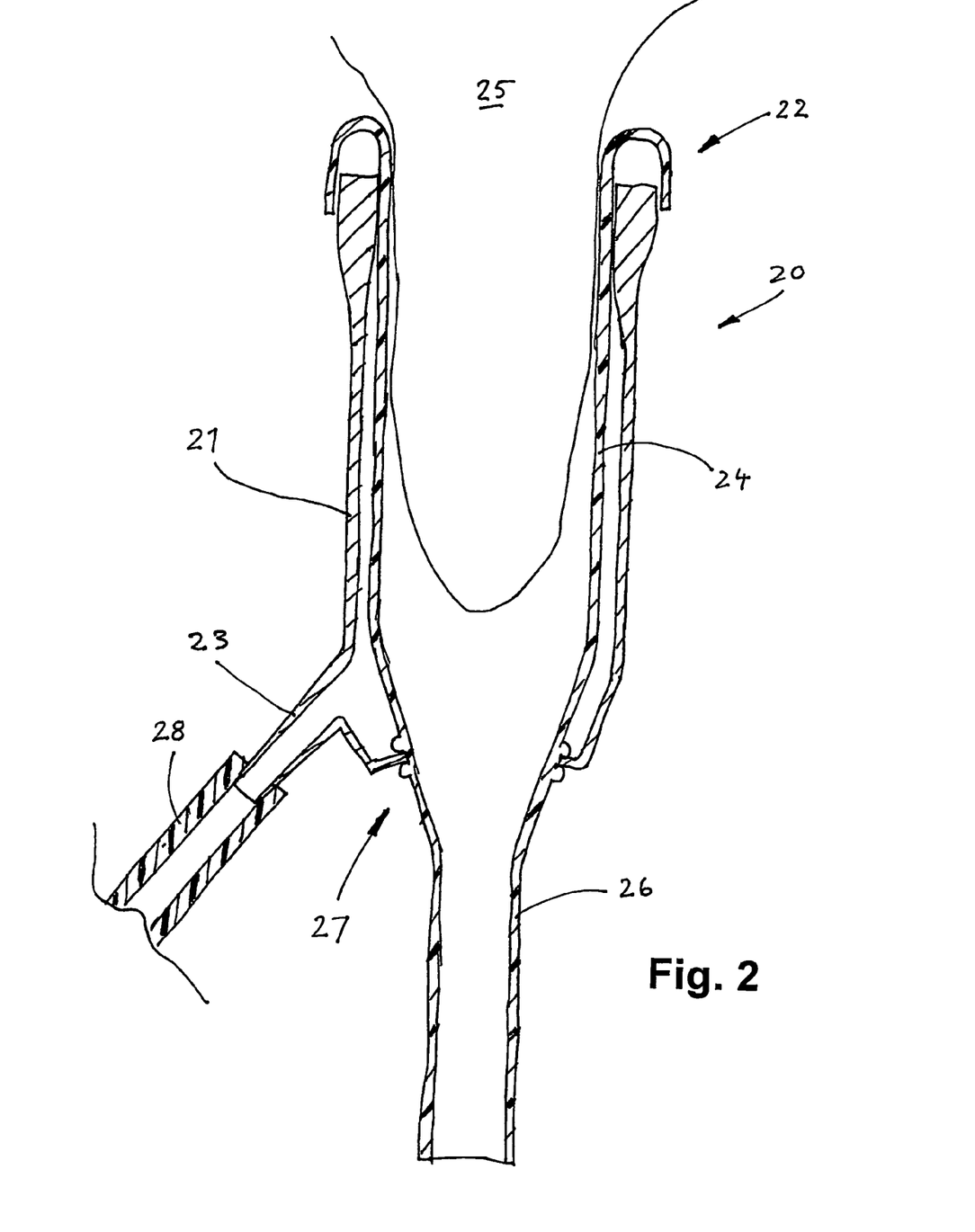
FIG. 2 schematically shows an embodiment of the invention in the form of a teat cup liner.

In a particular embodiment of the present invention, there is provided a teat cup liner wherein it is specifically the flexible teat receiving sleeve portion of the liner that is made of such a material or material combination. A liner 20 according to the invention is schematically illustrated in FIG. 2, as mounted in a likewise schematically represented teat cup shell 21. The liner comprises a head portion 22, a flexible sleeve portion 24 for receiving a teat 25 in a substantially close fit. By "close fit" is meant that there will be no significant amounts of air leaking in from between the teat and the sleeve in operation, i.e. during milking. The sleeve extends from the head portion 22 to a transition region 27 where a short milk tube 26 connects to the sleeve 24. This milk tube 26 can be integrated with the sleeve or, as in the prior art device in FIG. 1, be a separate member connectable to the sleeve.

Suitably the transition region 27 is made stiffer in order that the liner can be rigidly attached to the teat cup shell 21, so as not to cause leakage. It is important that the sleeve be fixed in a defined and particular position in the shell. The provision of a stiffer portion is possible by employing a combination of materials in accordance with the invention, as will be discussed further below.

Furthermore, the teat cup shell is to be connected to a supply of pulsating medium in order that the sleeve of the liner be able to perform its function. This supply is provided via a pulsation tubing 28 connectable to the teat cup shell 21 at an inlet connector 23, such that the pulsation can act on the sleeve 24.

The most important element of a liner is the flexible sleeve 24, in the sense that it is this element that performs the function by alternatingly collapsing and opening/expanding, caused by the pulsating vacuum applied. Thus, in order that the liner be able to fulfil its technical function, at least the flexible sleeve must meet certain criteria with respect to material properties.

The following list contains examples of properties that a liner having a flexible sleeve based on TPE, and that is connectable to the teat/animal and to the overall milking system should exhibit.

It must be capable to remove milk from the udder of an animal by means of vacuum means It should be capable of transporting milk within closed systems It should be connectable via an interface to the overall milking system The teat should be subjected to massage The flexible sleeve should stimulate the animal The flexible sleeve should comply with regulations relating to materials and articles intended to come into contact with foodstuffs The flexible sleeve should be able to act as a barrier and should not be influenced by the milk The flexible sleeve should have a tension or compression being constant or variable It should exhibit a sealing function The flexible sleeve should be attachable to the teat automatically or manually The flexible sleeves functionality should be controllable The flexible sleeve is based on a material that should withstand the milking environment The flexible sleeve is based on a material that should be processable The flexible sleeve should be possible to fix and seal against an outer hard shell The flexible sleeve should fit teats of all sizes Preferably the flexible sleeve should consist of one or many material or combinations thereof The flexible sleeve is based on a material that consists of TPE or TPE in combination with other materials Smooth milk-transport should be allowed The above criteria are met with a liner having at least a flexible sleeve made of a material that comprises a TPE, as defined in ISO 18064, or a plasticized PVC, or a Vinyl TPE, or combinations thereof, or combinations with other suitable materials.

The elastomeric material of the milking device according to the invention, should exhibit (at least) the following properties:

A hardness between 25 shore A and 50 shore D
A Young's modulus between 0.1 MPa and 50 MPa
A tensile strength typically above 0.5 MPa
A minimum elongation of 50% without breakage Optionally the milking device should exhibit A service temperature typically between −60 C and +200 C Suitably the material is resistant to acids, in particular formic acid, propionic acid, peracetic acid, and/or $H_2O_2$. The material is also preferably resistant to alkali, in particular to ammonia, NaOH and KOH. Suitable concentrations are those commonly used in washing or cleaning procedures used in the dairy industry.

The material should also be resistant to chlorine, ozone and to UV irradiation and thermal oxidation.

In preferred embodiments, the material exhibits a tear strength between 5 and 50 kN/m, preferably 15-35 kN/m.

In preferred embodiments, the material exhibits a tensile strength of 0.5-40 MPa, preferably 5-20 MPa.

It should also in preferred embodiment exhibit an elongation which is more than 200% before breakage, preferably more than 300%.

The material is preferably a thermoplastic vulcanisate (TPV), comprising two phases consisting of a thermoplastic continuous phase and a cross-linked rubber as a discontinuous phase, wherein the thermoplastic elastomer comprises a rubber selected from butadiene rubber; silicone; EPDM; NBR optionally grafted with acrylates or anhydrides.

Other possible polymers are nitrile rubber, styrene-butadiene rubber, butyl rubber, halo-butyl rubber, ethylene-propylene rubber, polyisoprene, polychloroprene, polybutene copolymers, chlorosulfonated polyethylene.

The thermoplastic elastomer preferably also comprises a crystalline polyolefin selected from polyethylene (HDPE, LDPE or LCDPE), polypropylene, or mixtures thereof, for example copolymers. By virtue of the excellent processability of the materials selected in accordance with the invention, it becomes possible to tailor liners to a large number of different applications or needs within the field of automated milking. Thus, it is possible to manufacture liners in a simple molding process to high dimensional accuracy, while combining different materials in different parts of the product. E.g. it is possible to provide the head portion and milk tube with a higher rigidity than the flexible sleeve has.

Below a number of possible embodiments based on material selections and material combinations will be described. All variations and modifications are applicable to all devices within the generic definition of the device according to the invention.

Thus, it is possible to make a device according to the invention (e.g. a liner, possibly comprising a short milk tubing and/or a short pulsation tubing) by using several variations or modifications in terms of material combinations, to provide for suitable properties for each specific use or application of the device according to the invention. Also, different parts of a device may be provided with different properties, adapted to the kind of environment that the specific part or portion of the device will come into contact with.

Particularly preferred TPE's for use with liners, in accordance with the invention, which give major and unexpected advantages over prior art materials, are TPV's (Thermo Plastic Vulcanisates).

This class of materials will provide a lower weight due to a density that is around 20% lower than prior art rubbers.

The resistance to fatigue is higher than expected. This means that a liner can be used for a longer time without having to be exchanged. The risk of hygienic problems is reduced. In the prior art devices cracks would appear much sooner, collecting bacteria and thereby creating a source for contamination.

TPV's will yield less "break in" problems, i.e. the change of properties during the very first hours of use is reduced to a low level. As an example the hysteresis phenomenon is much less outspoken. This means that the pulsation behaviour will become more predictable.

Among the possible variations and modifications suggested above, a first alternative would be to use a combination of two soft materials. Such a combination would be applicable for a device exhibiting different types of chemical resistance. As an example, the inside of the device may be subjected to milk, which requires certain properties, such as fat resistance and ability to withstand exposure to water and washing agents (primarily the short milk tube), and the outside may be exposed to the environment in a cowshed or barn, or an outdoor environment, which places other requirements on the material, e.g resistance to ammonia, UV light, ozone.

This particular type of device could be composed of an NBR based TPV for the inner side of the device, in combination with an EPDM based TPV for the outside, the latter being ozone and weather resistant.

Another modification of this type of combination is to provide a device with a barrier surface (inner and/or outer) coating on a core or bulk material, the latter providing the mechanical properties. The barrier properties could be e.g. fat and detergent resistance on the inner surfaces, and weather and barn environment resistance on the outer surface of the device. The properties of the core or bulk material could be e.g. high elasticity and low damping in order to achieve rapid milking, and/or high creep resistance in order to provide for non-changing milling behaviour/properties over time. The damping is quantified by the tan δ of the material, which is a measure of the non-elasticity of the material. In this case tan δ should be <0.20.

An example of a suitable material combination would be SBS, SEBS or SIS in the bulk, and an EPDM or NBR based TPV in the surface layer, both on the inside and the outside of the device.

A second alternative is a combination of a soft and a hard material.

A liner as it is designed today, has different parts performing different functions. The sleeve will work dynamically, whereas the connection to the claw will work statically and has the function of a sealing. In one embodiment it is suggested according to the invention that the short milk tubing and the attachment against the teat cup central be made from a stiff/rigid material. This would render the attachment simpler by means of a quick coupling, in a broad sense, which is much easier to achieve with a rigid material than with soft rubbery material. The sleeve, on the other hand, is made from a soft rubbery material for the purpose of achieving optimal massaging and milking properties.

Examples of materials suitable for the latter application are various hardness grades of EPDM or NBR based TPV. It is also possible to employ soft EPDM based TPV in combination with TPU (urethane based TPE), TPA (amide based TPE) or TEEE (ester based TPE).

For the particular application of the inventive concept to (teat cup) liners, there are a number of specific and unexpected advantages of using TPV.

Namely, production related advantages are e.g.: the production cost will be more attractive; it will become easier to obtain closer tolerances in the produced items, thus it will become easier to predict the properties of the final product; the material spillage can be reduced; less variations in the production process gives more uniform product properties from batch to batch; use of the materials according to the invention will make welding possible as a production means. However, the most unexpected property is the high resistance to fatigue.

Environmental advantages to be mentioned are: recycling of production scrap material is possible directly back into production by granulating the spillage; lesser amounts of potentially harmful additives, thereby making handling will become less hazardous for staff, e.g. no vulcanization gases will be present.

Suitably the devices described above are manufactured by injection molding of one or more materials according to the desired properties. Alternatively, if the structure is more complicated, injection molding or other molding techniques are preferred. Thus, devices comprising two or more materials in combination, i.e. forming a composite material, can be joined together in several ways. Dual injection of two (or more) materials in sequence in one and the same mold can be used. Another option is to make a "precursor" from one material in a first mold, and then move the "precursor" to a second mold in which a one or more further materials are injected. It is also possible to injection mold or extrude the different components separately using different materials, and then weld the components together. Certain components or parts, can be coupled by simply putting one together with the other.

However, it will pertain to the field of the skilled man to design the molding processes in detail to obtain the desired structures and the set ups necessary to obtain them, and such methods will therefore not be discussed in further herein.

The invention claimed is:

1. A milking device comprising at least a teat receiving flexible sleeve, adapted to be positioned on/over a teat, wherein at least a first portion thereof comprises a thermoplastic vulcanisate (TPV) comprising a thermoplastic continuous phase and a cross-linked rubber discontinuous phase and exhibiting the following properties:
   a) a hardness between 25 shore A and 50 shore D;
   b) a Young's modulus between 0.1 MPa and 50 MPa;
   c) a tensile strength above 0.5 MPa; and
   d) a minimum elongation of 50% without breakage.

2. The milking device as claimed in claim 1, wherein the cross-linked rubber discontinuous phase comprises a butadiene rubber; silicone; EPDM; or NBR optionally grafted with acrylates or anhydrides, or a combination of any or all of these.

3. The milking device as claimed in claim 1, wherein the cross-linked rubber is selected from the group consisting of nitrile rubber, styrene-butadiene rubber, butyl rubber, halobutyl rubber, ethylene-propylene rubber, polyisoprene, polychloroprene, polybutene copolymers, and chlorosulfonated polyethylene.

4. The milking device as claimed in claim 1, wherein the thermoplastic continuous phase comprises a crystalline polyolefin selected from the group consisting of polyethylene, polypropylene, or copolymers, and mixtures thereof.

5. A milking device comprising at least a teat receiving flexible sleeve, adapted to be positioned on/over a teat, wherein at least a first portion thereof comprises a thermoplastic elastomers (TPE) exhibiting the following properties:
   a) a hardness between 25 shore A and 50 shore D;
   b) a Young's modulus between 0.1 MPa and 50 MPa;
   c) a tensile strength above 0.5 MPa; and
   d) a minimum elongation of 50% without breakage,
   wherein at least a further portion comprises a TPE, the further portion is different from the first portion by at least one of (i) type of TPE and (ii) stiffness/hardness,
   wherein said TPE of said first portion and said TPE of said further portion comprise a two phase system with a first phase including a harder polymer providing mechanical strength and a second phase including a softer rubbery polymer.

6. The milking device as claimed in claim 5, wherein said first portion comprises a core material, and wherein said further portion is at least a partial surface coating on said core material.

7. The milking device as claimed in claim 6, wherein the core material has a tan $\delta$<0.20.

8. The milking device as claimed in claim 6, wherein the further portion is different from the first portion by the type of TPE, and the core material is an SBS or SEBS, and the surface coating is an EPDM based TPV or NBR.

9. The milking device as claimed in claim 5, wherein the TPE of said further portion is different from the TPE of said first portion in that the TPE of the first portion exhibits a higher stiffness/hardness than the TPE of said further portion.

10. The milking device as claimed in claim 9, wherein the TPE exhibiting a higher stiffness/hardness comprises a hard EPDM based TPV or a hard NBR based TPV, TPU, TPA or TEEE, and a softer part that is a soft EPDM based TPV or a soft NBR based TPV.

11. The milking device as claimed in claim 1, exhibiting a service temperature between −60 and +200° C.

12. The milking device as claimed in claim 1, wherein the TPE is resistant to chlorine, ozone and to UV irradiation and thermal oxidation.

13. The milking device as claimed in claim 1, wherein the TPE exhibits a tear strength between 5 and 50 kN/m.

14. The milking device as claimed in claim 1, wherein the tensile strength of the TPE is 0.5-40 MPa.

15. The milking device as claimed in claim 1, wherein the elongation of the TPE is more than 200% before breakage.

16. A milking device comprising:
   a head portion (22);
   a sleeve (24), and
   a separate milk tube (26), connectable with the sleeve (24), the sleeve (24) being a teat receiving flexible sleeve, adapted to be positioned on/over a teat, wherein at least a first portion thereof comprises a thermo-plastic elastomers (TPE) comprising a two phase system with a first phase including a harder polymer providing mechanical strength and a second phase including a softer rubbery polymer, the TPE exhibiting the following properties:
   a) a hardness between 25 shore A and 50 shore D;
   b) a Young's modulus between 0.1 MPa and 50 MPa;
   c) a tensile strength above 0.5 MPa; and
   d) a minimum elongation of 50% without breakage.

17. The milking device as claimed in claim 1, which is a teat cup liner, adapted to be positioned on/over a teat in a close fit, comprising a head portion (22), a sleeve (24) and a milk tube (26) integrated in a unitary structure.

18. The milking device as claimed in claim 4, wherein the polyolefin is selected from the group consisting of HDPE, LDPE, and LLDPE.

19. The milking device as claimed in claim 13, wherein the TPE exhibits a tear strength between 15-35 kN/m.

20. The milking device as claimed in claim 14, wherein the tensile strength of the TPE is 5-20 MPa.

21. The milking device as claimed in claim 15, wherein the elongation of the TPE is more than 300% before breakage.

22. A milking device comprising at least a teat receiving flexible sleeve, adapted to be positioned on/over a teat, wherein at least a first portion thereof comprises a a thermoplastic elastomers (TPE) comprising a two phase system with first phase including a harder polymer providing mechanical strength and a second phase including a softer rubbery polymer, the TPE exhibiting the following properties:

a) a hardness between 25 shore A and 50 shore D;
b) a Young's modulus between 0.1 MPa and 50 MPa;
c) a tensile strength above 0.5 MPa; and
d) a minimum elongation of 50% without breakage.

* * * * *